United States Patent [19]
Lenz et al.

[11] Patent Number: 5,973,936
[45] Date of Patent: Oct. 26, 1999

[54] CURRENT-VOLTAGE REGULATOR

[75] Inventors: Michael Lenz, Zorneding; Frank-Lothar Schwertlein, München, both of Germany

[73] Assignee: Siemens Aktiengesellschaft, Munich, Germany

[21] Appl. No.: 09/213,725

[22] Filed: Dec. 17, 1998

[30] Foreign Application Priority Data

Dec. 17, 1997 [DE] Germany ............... 197 56 233

[51] Int. Cl.$^6$ ............... H02M 3/00; G05F 1/56
[52] U.S. Cl. ............... 363/15; 323/285
[58] Field of Search ............... 363/15, 16, 73, 363/97, 131; 323/222, 266, 282, 285

[56] References Cited

U.S. PATENT DOCUMENTS

| | | | |
|---|---|---|---|
| 4,539,529 | 9/1985 | Lenz | 330/295 |
| 4,953,070 | 8/1990 | Lenz | 363/58 |
| 5,515,027 | 5/1996 | Billig et al. | 340/438 |
| 5,616,846 | 4/1997 | Kwasnik | 73/708 |

FOREIGN PATENT DOCUMENTS 41 06 915 C2  2/1993  Germany .

OTHER PUBLICATIONS

"Electronic Circuits Design and Applications", U. Tietze et al., Springer–Verlag 1991, pp. 502–511.

Ing.(grad.) Erich Holle: "Der OTA—eine Weiterentwicklung des Operationsverstärkers", Elektronik 1973, Heft 7, pp. 247–251, the OTA—a further development of the operational amplifier.

Wilfried Blaesner: "Ein stromprogammierbarer Operationsverstärker in Anwendungsbeispielen", Der Elektroniker Nr. Sep. 1986, a power programmable operational amplifier in exemplary applications.

*Primary Examiner*—Matthew Nguyen
*Attorney, Agent, or Firm*—Herbert L. Lerner; Laurence A. Greenberg

[57] ABSTRACT

The current-voltage regulator has a reference voltage source with an output. Two transconductance amplifiers each have two inputs and a current output. The current outputs of the transconductance amplifiers are coupled to one another and form an output of the current-voltage regulator. One of the inputs of the transconductance amplifiers is coupled to the output of the reference voltage source, and the other inputs of the transconductance amplifiers are driven, respectively, by a current sensor signal and a voltage sensor signal.

7 Claims, 1 Drawing Sheet

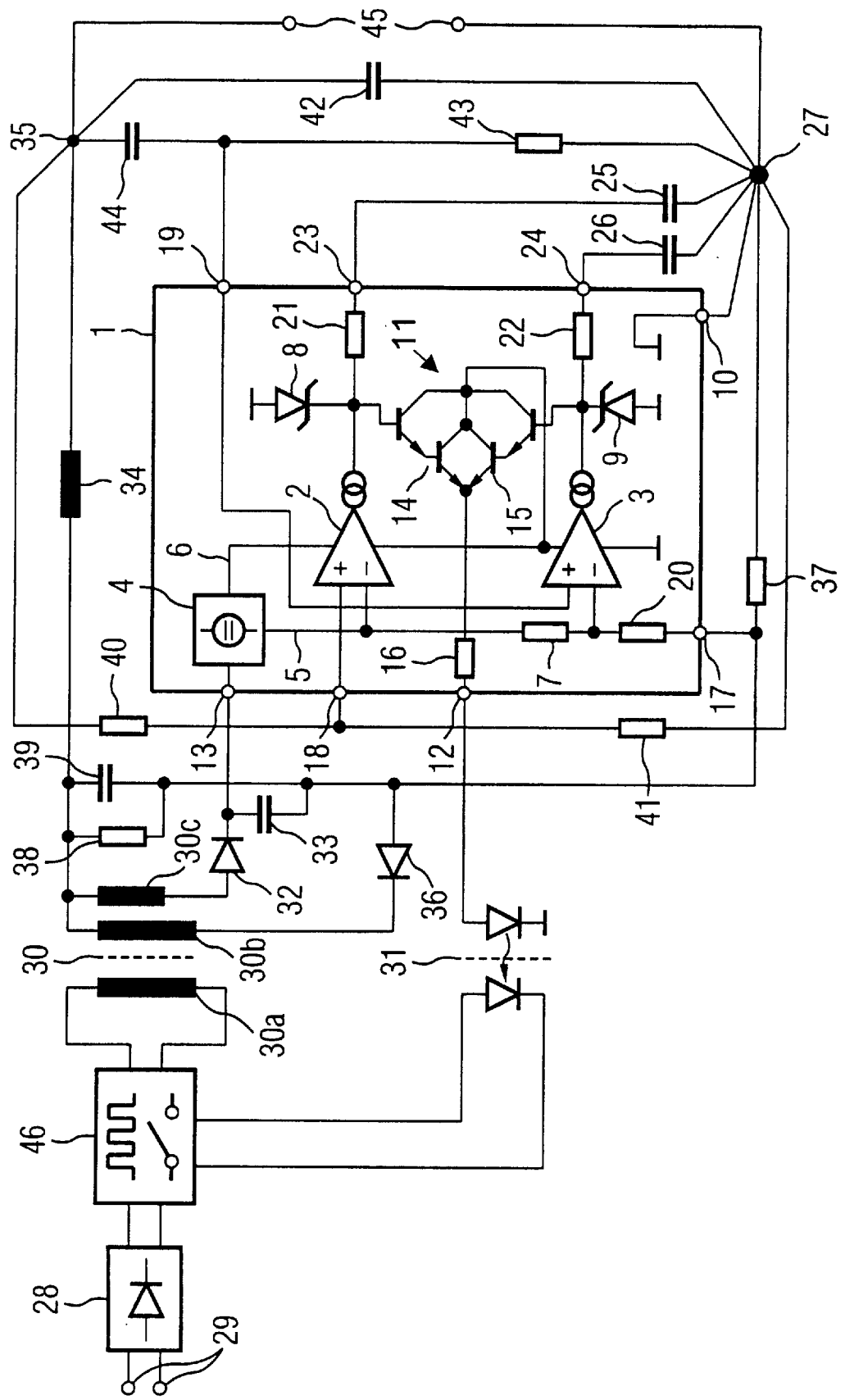

CURRENT-VOLTAGE REGULATOR

BACKGROUND OF THE INVENTION

Field of the Invention

The invention relates to a current-voltage regulator in particular for use in switched-mode power supplies.

Switched-mode power supplies are disclosed, for example, in Tietze and Schenk, "Electronics Circuits—Design and Applications," Springer 1991, pp. 502–10. Switched-mode power supplies of this type usually comprise a rectifier, a power switch for pulse width modulation, a filter and also a regulator for controlling the power switch. An input voltage (for example the rectified mains power supply voltage) is converted into a pulsed DC voltage with a variable duty ratio by the power switch acting as pulse width modulator. The pulse frequency may be variable or fixed in this case. The task of the regulator, then, consists in keeping the voltage at the output of the filter constant in a defined output current range. When the maximum output current is reached, the output current ought to be kept constant up to an output voltage of zero volts. The regulator must therefore process the voltage at the output of the filter and the current at the output of the filter as input variables and from them form a control signal for the power switch. The timing ratio of the switch is in this case influenced by the control signal.

In prior art regulators, the voltage-current comparison is in each case realized by means of an operational amplifier and also external resistance and capacitance networks. In this case, a current-voltage converter is usually connected upstream of the operational amplifier provided for the current comparison. The signals at the output of the operational amplifiers are thereby added and converted into a control current by means of a voltage-current converter. What is problematic in this case is the high outlay on circuitry and also the accuracy that can be achieved with integrated circuit technology.

SUMMARY OF THE INVENTION

It is accordingly an object of the invention to provide a current-voltage regulator, which overcomes the above-mentioned disadvantages of the heretofore-known devices and methods of this general type and the design layout of which is better suited to implementation in integrated circuit technology.

With the foregoing and other objects in view there is provided, in accordance with the invention, a current-voltage regulator, comprising:

a reference voltage source with an output;

a first transconductance amplifier with a first input, a second input, and a current output;

a second transconductance amplifier with a first input, a second input, and a current output;

the current outputs of the first and second transconductance amplifiers being coupled to one another and forming an output of the current-voltage regulator;

the first inputs of the first and second transconductance amplifiers being coupled to the output of the reference voltage source; and the second input of the first transconductance amplifier being driven by a current sensor signal and the second input of the second transconductance amplifier being driven by a voltage sensor signal.

In other words, the current-voltage regulator according to the invention comprises, in particular, a reference voltage source having an output and also two transconductance amplifiers each having two inputs and a current output. The current outputs of the transconductance amplifiers are thereby coupled to one another and form an output of the current-voltage regulator.

In each case one of the inputs of the transconductance amplifiers is coupled to the output of the reference voltage source. The respective other inputs of the transconductance amplifiers are driven by in each case a current sensor signal and a voltage sensor signal, respectively. The advantage here is that this arrangement can easily be monolithically integrated since it is not necessary to integrate any compensation capacitances. At the same time, very few external components are required and, moreover, full flexibility is maintained in the regulating behavior, it being possible to achieve very small tolerances and to dispense with subsequent adjustment work.

In accordance with an added feature of the invention, two transistors are employed to couple the current outputs of the first and second transconductance amplifiers to one another, the two transistors each having a collector terminal connected to a supply potential, a base terminal connected to a respective current output, and an emitter terminal connected to the output of the current-voltage regulator.

The transistors for coupling the current outputs operate as impedance converters (emitter followers) and decouple the high-impedance current outputs from the output of the current-voltage regulator. That output is usually loaded with low impedance. Instead of two transistors, it is also possible to use two diodes in the case of a high-impedance load, the diodes each being connected in the forward direction between a respective current output and the output of the current-voltage regulator. As a result, the output current of one of the transconductance amplifiers is prevented with simple means from being fed into the output of the respective other transconductance amplifier. Consequently, the two transconductance amplifiers cannot mutually influence one another.

In accordance with an additional feature of the invention, the two transistors are Darlington transistors.

In accordance with another feature of the invention, a compensation network is connected downstream of each of the current outputs of the first and second transconductance amplifiers. A compensation network of this type comprises, for example, resistors and capacitors and preferably has a capacitor which is connected downstream of the current output of the respective transconductance amplifier via a resistor. If a network of this type is connected downstream of each of the transconductance amplifiers, then it is possible to implement the resistors through integrated technology, in which case, on account of the integrated circuit technology, the resistors of the compensation networks have the same production tolerances and the same temperature response as the resistors which determine the transconductance of the transconductance amplifiers. The voltage gain of the transconductance amplifiers is thereby kept constant.

In accordance with again a further feature of the invention, therefore, at least one of the compensation networks includes a capacitor and a resistor connected between the current output of one of the first and second transconductance amplifier and the capacitor.

In accordance with a further feature of the invention, a voltage limiting element is connected to the current output of the first transconductance amplifier and a voltage limiting is element connected to the current output of the second transconductance amplifier.

In this case, the two transconductance amplifiers preferably receive a bias signal which, for its part, is preferably generated by the reference voltage source. As a result, fluctuations in the input voltage are effectively compensated for.

In accordance with a concomitant feature of the invention, the first input of one of the transconductance amplifiers is an inverting input and the second input is a noninverting input, and including a current sensor element having a first terminal connected to the noninverting input of the one transconductance amplifier and a second terminal, a first resistor connected between the second terminal of the current sensor element and the inverting input of the one transconductance amplifier, and a second resistor connected between the inverting input of the one transconductance amplifier and the output of the reference voltage source.

In more general terms, the noninverting input of one transconductance amplifier is connected to a terminal of a current sensor element and the inverting input is connected to the other terminal of the current sensor via a first resistor and also to the reference voltage source via a second resistor. Floating tapping of the voltage drop across the current sensor element is thus achieved.

Other features which are considered as characteristic for the invention are set forth in the appended claims.

Although the invention is illustrated and described herein as embodied in a current-voltage regulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiment when read in connection with the accompanying drawing.

BRIEF DESCRIPTION OF THE DRAWINGS

The FIGURE is a schematic circuit diagram of the novel current-voltage converter.

DESCRIPTION OF THE PREFERRED EMBODIMENTS

Referring now to the sole FIGURE of the drawing in detail, the exemplary embodiment of the invention is a current-voltage regulator 1 which has a transconductance amplifier 2 and also a transconductance amplifier 3. Operational transconductance amplifiers (OTA) are used, for example, as the transconductance amplifiers. Furthermore, a reference voltage source 4 is provided which, for its part, is fed by a supply voltage via a supply terminal 13 of the current-voltage regulator 1 and has a reference voltage output 5 and also a bias voltage output 6. The bias voltage at the output 6 feeds the transconductance amplifiers 2 and 3. The inverting input of the transconductance amplifier 2 is connected directly to the output 5 carrying the reference voltage, and the inverting input of the transconductance amplifier 3 is connected to the output 5 with the interposition of a resistor 7. The current outputs of the transconductance amplifiers 2 and 3 are, on the one hand, each connected to a reference-ground potential terminal 10 via a Zener diode 8 and 9, respectively, and are also coupled to one another, via a coupling network 11 that forms an output 12 of the current-voltage regulator 1. In this case, for example, the coupling network 11 comprises two transistors 14 and 15, which are coordinated with one another, whose base terminals are connected to a respective output of one of the transconductance amplifiers 2 and 3 and whose emitter terminals are coupled to one another and, with the interposition of a resistor 16, also to the output 12. The collector terminals of the two transistors 14 and 15 are connected to a supply voltage which, in the exemplary embodiment, is picked off at the output 6 of the reference voltage source 4. Furthermore, the noninverting input of the transconductance amplifier 2 is connected to an input 18 of the current-voltage regulator 1, and the noninverting input of the transconductance amplifier 3 is connected to an input 19 of the current-voltage regulator 1. The inverting input of the transconductance amplifier 3 is connected up to a terminal 17 of the current-voltage regulator 1 via a resistor 20.

The outputs of the transconductance amplifiers 2 and 3 are connected to a respective terminal 23 and 24 of the current-voltage regulator 1 via a respective resistor 21 and 22. The terminals 23 and 24 serve for the connection of capacitors 25 and 26. The capacitors 25 and 26 are connected, on the one hand, to a ground node 27 and, on the other hand, with the interposition of the resistors 21 and 22, to the current outputs of the transconductance amplifiers 2 and 3. The resistors 21 and 22 together with their corresponding capacitors 25 and 26 each form compensation networks. Finally, the current-voltage regulator 1 is designed as an integrated circuit in the present exemplary embodiment.

The current-voltage regulator 1 is part of a switched-mode power supply in the exemplary embodiment. This switched-mode power supply comprises, in addition to the current-voltage regulator 1, a rectifying unit 28, which is fed by a mains power supply voltage 29. Connected downstream of the rectifying unit 28 is a switching unit 46, which chops the rectified mains power supply voltage by means of a pulse width-modulated signal and feeds the latter into a primary side 30a of a transformer 30. The switching unit 46 is controlled by means of a control signal which influences the pulse width and is picked off at the secondary side of an optocoupler 31. The primary side of the optocoupler 31 is connected to the output 12 of the current-voltage regulator 1. The secondary side of the transformer 30 has two windings 30b and 30c, one (30c) of which is provided for the power supply of the current-voltage regulator 1 and is therefore connected, with the interposition of a rectifier, to the terminal 13 of the current-voltage regulator 1. The rectifier comprises a diode 32, which is connected, on the one hand, to a terminal of the one secondary winding 30c and, on the other hand, to the terminal 13, and also comprises a smoothing capacitor 33 which is connected between the terminals 13 and 17 of the current-voltage regulator 1. The other terminal of the one secondary winding 30c is connected, in the same way as a terminal of the further secondary winding 30b, via an inductor 34 to a supply node 35. The other terminal of the further secondary winding 30b is connected to the terminal 17 of the current-voltage regulator 1 via the diode 36. In this case, the terminal 17 is coupled to the ground node 27 via a current sensor formed by a resistor 37. Furthermore, the terminal 17 is connected up via a parallel circuit formed by a resistor 38 and a capacitor 39 to the common node of inductor 34 and also the two secondary windings 30b and 30c. Also connected between the ground node 27 and the supply node 35 are, in addition, a smoothing capacitor 42, a voltage divider with the resistors 40 and 41 and also an RC element with a resistor 43 and a capacitor 44 connected in series therewith. The tap of the voltage divider with the resistors 40 and 41 is in this case connected up to the terminal 18 and the tap of the RC element with the resistor 43 and the capacitor 44 is connected up to the terminal 19 of the current-voltage regulator 1. Finally, the converted DC output voltage 45 and the output current can respectively be tapped between the ground node 27 and the supply node 35.

The method of operation of the current-voltage regulator 1 according to the invention is based on the use of two transconductance amplifiers 2 and 3 for monitoring the output voltage 45 and for monitoring the output current. The additive combination of the output currents of the two transconductance amplifiers 2 and 3 is effected in a simple manner by connecting both current outputs together. The coupling network 11 prevents reciprocal coupling in of current. The transistors of the coupling network 11 are in this case implemented as Darlington transistors. The resistor 16 which determines the output resistance and also the resistors 21 and 22 which are associated with the respective compensation networks are co-integrated in the integrated circuit. The current and/or voltage regulating loop can thereby be compensated for individually by supplementarily connecting corresponding capacitances to the terminals 23 and 24.

Since the resistors 21 and 22 and also the resistance in the bias block of the transconductance amplifier, which determines the transconductance thereof, have the same production tolerances and the same temperature behavior, the voltage gain of the transconductance amplifiers 2 and 3 always remains constant. In this case, the following hold true:

$$V = S \cdot R$$

$$S = I/U_T \text{ and}$$

$$U_T = kT/e$$

where V designates the gain of the respective transconductance amplifier, S designates the transconductance thereof, R designates the resistance of the respective resistor 21 or 22, I designates the operating current of the differential amplifier within the transconductance amplifier 2 or 3, $U_T$ designates the voltage equivalent of thermal energy, k designates the Boltzmann constant, T designates the absolute temperature and e designates the elementary charge. If the current in the bias block of the transconductance amplifiers 2 and 3 is set in accordance with the relationship:

$$I = U_T \cdot C/R_B,$$

then the following holds true $$V = R \cdot C/R_B = constant.$$

Here, C is a constant and $R_B$ is the bias resistance in the bias block.

If the fixedly set gain is insufficient, then it is possible to supplementarily connect external series resistors. In that case, however, the gain is no longer entirely independent of the temperature and of the production tolerances. A further important part of the current-voltage regulator 1 is the voltage reference source 4, which is implemented as a highly accurate bandgap reference, for example. It serves, inter alia, as a regulating reference for the transconductance amplifiers 2 and 3.

The threshold of the transconductance amplifier 3 which monitors the current (output current threshold) is determined by the resistors 7 and 20. The transconductance amplifier 3 thereby regulates the output current in the event of a differential input voltage lying between the value at the input 9 and the reference voltage at the output 5 of the reference voltage source 4. In this case, given a voltage $V_{17}$ at the current sensor input 17, the reference voltage $V_5$ and a voltage $V_{19}$ present at the current reference input 19, the following holds true: $V_{17} - V_{19} = (V_5 - V_{19}) R_7/R_{20}$. $R_7$ and $R_{20}$ designate the resistances of the resistors 7 and 20. In the normal case, the terminal 19 is connected to the ground node 27 since the external current sensor resistor 37 is likewise connected to the ground node 27 at one end. Given a floating current sensor resistor 37, however, it is also possible for floating operation to be effected in the same way. In addition, it is possible to co-integrate on the chip a Zener voltage prestabilization circuit, which is preferably contained in the block biasing, and a respective voltage clamping circuit with the Zener diodes 8 and 9. The clamping of the outputs by means of the Zener diodes 8 and 9 limits the maximum output current at the output 12 in such a way that even in the event of high input voltages, the component cannot overheat.

It is advantageous in the case of a current-voltage regulator according to the invention, in particular in the case of implementations using integrated circuit technology, that few external components are required yet maximum flexibility is ensured nonetheless. Furthermore, the current-voltage regulator according to the invention is distinguished by very small tolerances, so that it is possible to dispense with subsequent adjustment measures such as, for example, laser adjustment of the output voltage.

We claim:

1. A current-voltage regulator, comprising:
   a reference voltage source with an output;
   a first transconductance amplifier with a first input, a second input, and a current output;
   a second transconductance amplifier with a first input, a second input, and a current output;
   said current outputs of said first and second transconductance amplifiers being coupled to one another and forming an output of the current-voltage regulator;
   said first inputs of said first and second transconductance amplifiers being coupled to said output of said reference voltage source; and
   said second input of said first transconductance amplifier being driven by a current sensor signal and said second input of said second transconductance amplifier being driven by a voltage sensor signal.

2. The current-voltage regulator according to claim 1, which further comprises two transistors coupling said current outputs of said first and second transconductance amplifiers to one another, said two transistors each having a collector terminal connected to a supply potential, a base terminal connected to a respective current output, and an emitter terminal connected to said output of the current-voltage regulator.

3. The current-voltage regulator according to claim 2, wherein said two transistors are Darlington transistors.

4. The current-voltage regulator according to claim 1, which further comprises a compensation network connected to each of said current outputs of said first and second transconductance amplifiers.

5. The current-voltage regulator according to claim 1, which further comprises a voltage limiting element connected to said current output of said first transconductance amplifier and a voltage limiting element connected to said current output of said second transconductance amplifier.

6. The current-voltage regulator according to claim 4, wherein at least one of said compensation networks includes a capacitor and a resistor connected between said current output of one of said first and second transconductance amplifier and said capacitor.

7. The current-voltage regulator according to claim 6, wherein said first input of one of said transconductance amplifiers is an inverting input and said second input is a noninverting input, and including a current sensor element having a first terminal connected to said noninverting input of said one transconductance amplifier and a second terminal, a first resistor connected between said second terminal of said current sensor element and said inverting input of said one transconductance amplifier, and a second resistor connected between said inverting input of said one transconductance amplifier and said output of said reference voltage source.

\* \* \* \* \*